(12) United States Patent (10) Patent No.: US 8,616,110 B2
Silva et al. (45) Date of Patent: Dec. 31, 2013

(54) METHOD AND APPARATUS FOR MAKING A FIBER REINFORCED ARTICLE

(75) Inventors: Raymond Silva, Maumee, OH (US); Jeffrey Scott Dahl, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 589 days.

(21) Appl. No.: 12/873,454

(22) Filed: Sep. 1, 2010

(65) Prior Publication Data

US 2012/0048082 A1 Mar. 1, 2012

(51) Int. Cl.
*B26D 7/06* (2006.01)
(52) U.S. Cl.
USPC .............................. 83/872; 83/102
(58) Field of Classification Search
USPC .............. 83/469, 870, 886, 887, 14, 872, 102
See application file for complete search history.

(56) References Cited

U.S. PATENT DOCUMENTS

| | | | | |
|---|---|---|---|---|
| 641,855 | A | * | 1/1900 | Glaser .............................. 30/307 |
| 1,794,398 | A | * | 3/1931 | Cameron et al. ................. 83/469 |
| 2,046,487 | A | * | 7/1936 | Robinson .......................... 83/14 |
| 2,320,858 | A | * | 6/1943 | Field ........................... 29/4.56 |
| 2,327,087 | A | * | 8/1943 | Rolland ........................ 264/141 |
| 2,467,291 | A | * | 4/1949 | Sheidley et al. ............. 156/62.6 |
| 2,477,555 | A | * | 7/1949 | Roberts et al. ................ 428/392 |
| 2,619,682 | A | * | 12/1952 | Varga ............................. 19/105 |
| 2,892,219 | A | * | 6/1959 | Thiele ........................... 19/65 R |
| 2,925,628 | A | * | 2/1960 | Boer ............................... 19/258 |
| 3,140,506 | A | * | 7/1964 | Arenson ............................ 16/47 |
| 3,427,654 | A | * | 2/1969 | Rasmussen ....................... 225/3 |
| 3,448,570 | A | * | 6/1969 | Stoller ........................... 57/350 |
| 3,504,861 | A | * | 4/1970 | McNinch, Jr. et al. ........ 239/300 |
| 3,560,178 | A | * | 2/1971 | Minkler ......................... 65/487 |
| 3,567,545 | A | * | 3/1971 | Bobkowics .................... 156/229 |
| 3,596,816 | A | * | 8/1971 | Brown .............................. 225/2 |
| 3,763,527 | A | * | 10/1973 | Yazawa ........................... 28/266 |
| 3,824,650 | A | * | 7/1974 | Watanabe ....................... 19/114 |
| 3,983,202 | A | * | 9/1976 | Skoroszewski ............... 264/147 |
| 4,134,951 | A | * | 1/1979 | Dow et al. ..................... 264/147 |
| 4,222,758 | A | * | 9/1980 | Stotler et al. .................... 65/486 |
| 4,348,248 | A | * | 9/1982 | Poncet .......................... 156/276 |
| 4,428,724 | A | * | 1/1984 | Levy ............................. 425/446 |
| 5,525,180 | A | | 6/1996 | Paul, Jr. et al. |
| 5,910,458 | A | * | 6/1999 | Beer et al. ..................... 442/367 |
| 5,935,289 | A | * | 8/1999 | Arterburn et al. .............. 65/471 |
| 6,012,277 | A | * | 1/2000 | Prins et al. ...................... 57/315 |
| 6,062,048 | A | * | 5/2000 | Arterburn et al. .............. 65/500 |
| 6,497,566 | B2 | | 12/2002 | Dahl et al. |
| 6,527,533 | B2 | | 3/2003 | Dahl et al. |
| 6,540,495 | B2 | | 4/2003 | Dahl et al. |
| 6,860,095 | B2 | * | 3/2005 | Tao et al. .......................... 57/75 |
| 6,890,465 | B2 | | 5/2005 | Dahl et al. |
| 7,691,223 | B2 | | 4/2010 | Dahl et al. |
| 2003/0200740 | A1 | * | 10/2003 | Tao et al. .......................... 57/60 |
| 2004/0247719 | A1 | * | 12/2004 | Peterson et al. ............. 425/114 |
| 2008/0083312 | A1 | * | 4/2008 | Zschoche ........................ 83/469 |
| 2009/0075050 | A1 | * | 3/2009 | Adzima et al. ............. 428/292.1 |
| 2010/0126412 | A1 | | 5/2010 | Dahl et al. |
| 2012/0305687 | A1 | * | 12/2012 | Folk et al. ....................... 241/68 |

* cited by examiner

*Primary Examiner* — Sean Michalski
(74) *Attorney, Agent, or Firm* — Damian Porcari; Brooks Kushman P.C.

(57) ABSTRACT

A method and apparatus for producing an article. The method includes providing a fiber material, splitting the fiber material with a splitting roller having a set of grooves that extend continuously around a circumference of the splitting roller, and cutting the fiber material to a desired length.

17 Claims, 3 Drawing Sheets

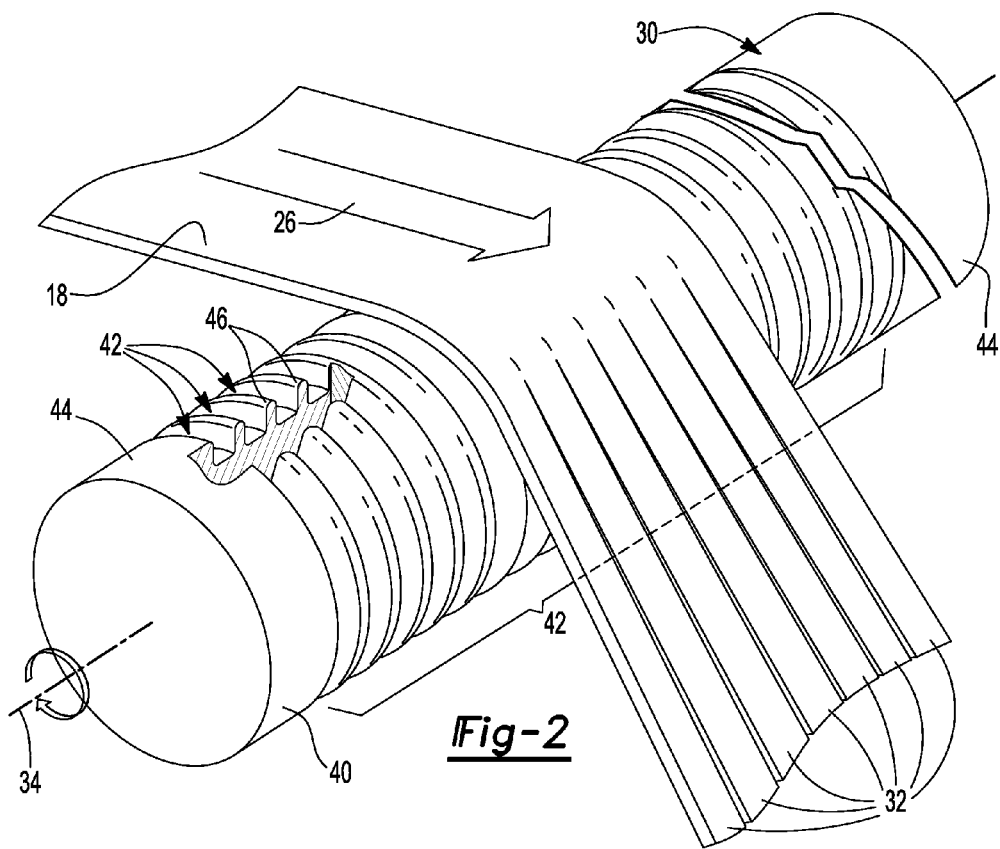
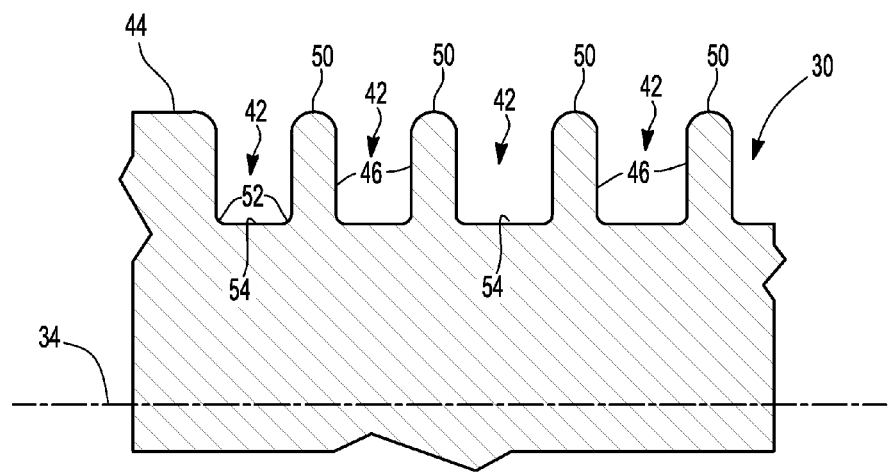

METHOD AND APPARATUS FOR MAKING A FIBER REINFORCED ARTICLE

BACKGROUND

1. Technical Field

The present invention relates to a method and apparatus for making an article having a fiber material.

SUMMARY

In at least one embodiment a method of producing an article is provided. The method includes providing a fiber material, splitting the fiber material with a splitting roller, and cutting the fiber material to a desired length. The splitting roller has a set of grooves that extend continuously around a circumference of the splitting roller.

In at least one embodiment an apparatus for producing an article is provided. The apparatus includes a splitting roller, a cutting roller, and a drive roller. The splitting roller is configured to rotate about a first axis and has a set of grooves that extend around a circumference of the splitting roller in a substantially parallel relationship for splitting a fiber material. The cutting roller is spaced apart from the splitting roller and configured to rotate about a second axis. The drive roller is configured to rotate the splitting and cutting rollers about the first and second axes.

In at least one embodiment an apparatus for producing an article is provided. The apparatus includes a splitting roller and a drive roller. The splitting roller has a set of grooves that extend around a circumference of the splitting roller in a substantially parallel relationship. A fiber material is separated into bundles by the splitting roller when the splitting roller is rotated by the drive roller.

BRIEF DESCRIPTION OF THE DRAWINGS

FIG. 2 is a perspective view of an embodiment of a splitting roller.

FIG. 3 is a fragmentary section view of the splitting roller of FIG. 2.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. In addition, any or all features from one embodiment may be combined with any other embodiment. Therefore, specific structural and functional details disclosed herein are not to be interpreted as limiting, but merely as a representative basis for the claims and/or as a representative basis for teaching one skilled in the art to variously employ the present invention.

Figure 1:
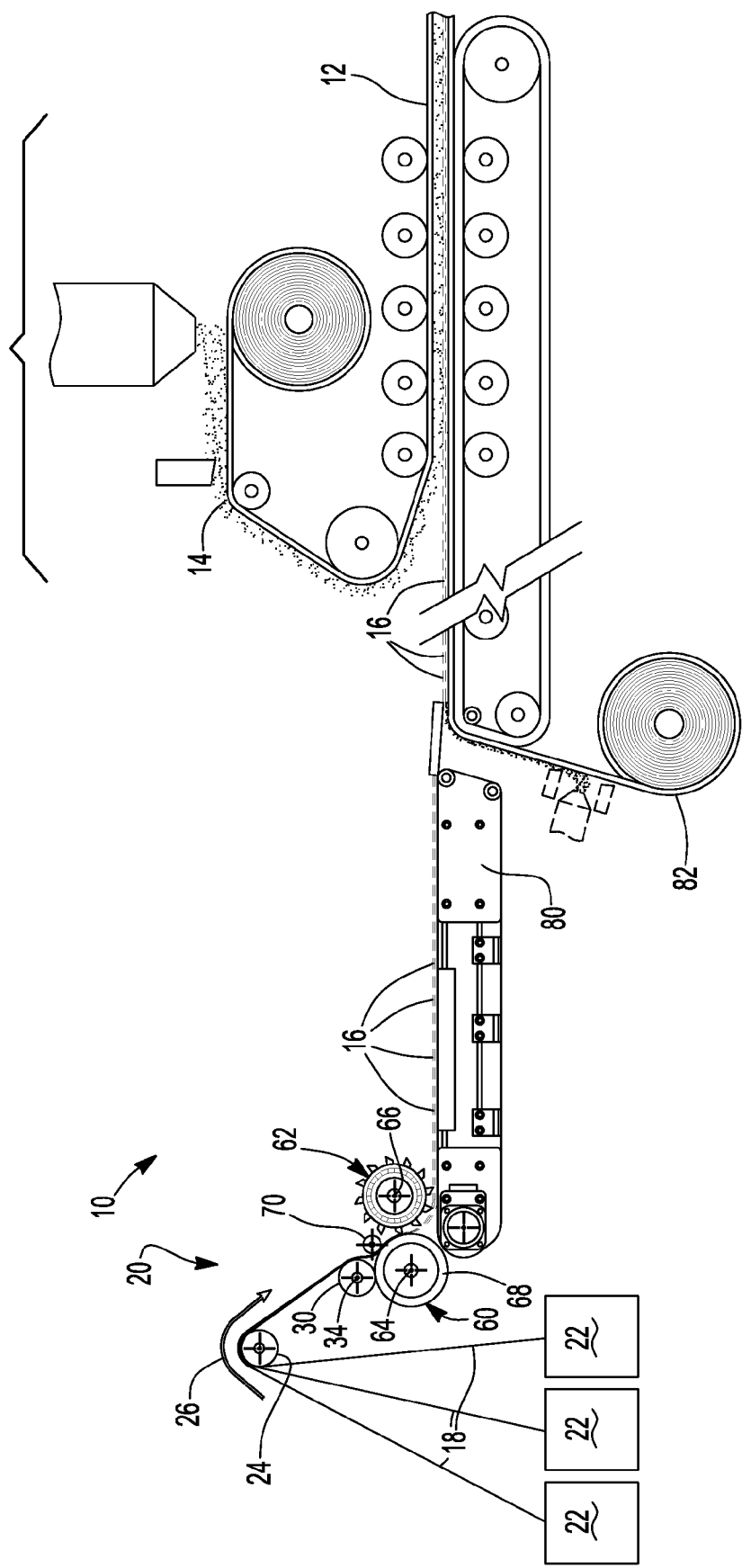
FIG. 1 is a side view of an exemplary apparatus for producing an article.

Referring to FIG. 1, a side view of an a apparatus or machine 10 used to make an article 12 is shown. The article 12 may be a sheet molding compound laminate that may include a resin compound 14 and a plurality of fiber rovings 16. The fiber rovings 16 may be made from a fiber material 18 that may be carbon fiber, fiberglass, polymeric fibers, natural fibers, or similar materials that may be provided to reinforce the article 12.

The machine 10 may include an apparatus 20 for producing the fiber rovings 16. The apparatus 20 may include one or more fiber material sources 22, such as a spool upon which fiber material 18 is wound. The fiber material 18 may be provided in a ribbon configuration and may include a plurality of fibers or filaments that may generally extend between ends of the ribbon. As such, the fibers of the fiber material 18 may be arranged generally parallel to each other. Moreover, at least some of the fibers may extend continuously between ends of the fiber material 18 and may be discontinuous with respect to each other.

The fiber material 18 may be unwound or fed from the fiber material source 22 along or across one or more guide rollers 24 that may help orient the fiber material 18 and/or provide a desired amount of tension upon the fiber material 18. A feed direction 26 of the fiber material 18 is represented by the arrow in FIG. 1.

Referring to FIGS. 1 and 2, the fiber material 18 may be fed from the one or more guide rollers 24 to a splitting roller 30. The splitting roller 30 may be configured to separate the fiber material 18 into a plurality of bundles 32. The splitting roller 30 may allow material such as large tow carbon fibers to be separated into smaller bundles or effectively into a smaller tow size as part of a continuous flow manufacturing process. Such a tow size reduction may improve material distribution and mechanical performance in a molded article such as a carbon fiber panel or a molded laminate. In addition, larger tow fibers may be employed as a material source instead of more expensive small tow fiber stock.

Referring to FIG. 2, one embodiment of a splitting roller 30 is shown in more detail. In FIG. 2, the splitting roller 30 is fragmented near one end to better show an exemplary cross section. In addition, only one ribbon of fiber material 18 is shown instead multiple ribbons for clarity. The splitting roller 30 may be made of any suitable material, such as a metal like aluminum, steel, or alloys thereof. Moreover, the splitting roller 30 may be anodized or provided with a surface coating, such as Teflon®, to reduce friction between the fiber material 18 and the splitting roller 30 to help the fiber material 18 disengage from the splitting roller 30 after splitting.

The splitting roller 30 may have a generally cylindrical body and may be configured to rotate about an axis of rotation 34. The splitting roller 30 may be sized to accommodate multiple ribbons or feeds of fiber material 18. In one exemplary embodiment, the splitting roller 30 may be approximately nine inches (228.6 mm) long and accommodate multiple feeds of fiber material 18 that are around one inch (25.4 mm) in width.

The splitting roller 30 may have an external surface 40. A portion of the external surface 40 may be provided with a set of grooves 42. The set of grooves 42 may be spaced apart from opposite ends of the splitting roller 30 by a pair of flats 44 or ungrooved surfaces that extend from the ends of the splitting roller 30. Members of the set of grooves 42 may extend continuously around a circumference of the splitting roller 30. As such, the members of the set of grooves 42 may be generally arranged substantially perpendicular to the axis of rotation 34 and may be disposed in a substantially parallel relationship (i.e., grooves may be disposed in substantially parallel planes). A tooth 46 may be disposed between adjacent grooves 42.

Figure 4:
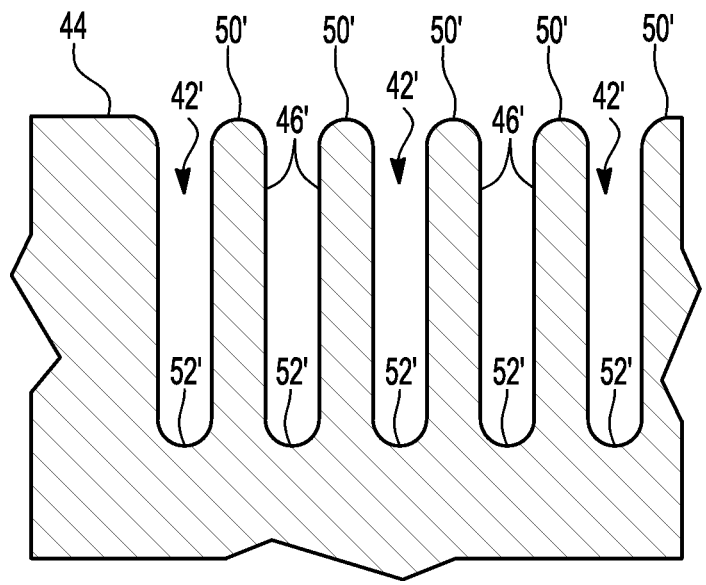
FIG. 4 is a fragmentary section view of another embodiment of a splitting roller.

Referring to FIGS. 3 and 4, magnified views of a splitting roller 30 with different embodiments of sets of grooves 42 are shown. In each embodiment, splitting of the fiber material 18 may be started upon engagement with the splitting roller 30 and may be completed before or simultaneously with disengagement from the splitting roller 30.

In FIG. 3, the set of grooves 42 is provided in a repeating arrangement. In this embodiment, the width of each groove 42 (extending in a direction along the axis of rotation 34) is greater than the width of each tooth 46. For example, each groove 42 may have a width of around 0.04 inches (1 mm) and each tooth 46 may be width of around 0.02 inches (0.5 mm), resulting in grooves 42 that are approximately twice as wide as the teeth 46. The grooves 42 may be provided with a depth (extending radially from the circumference of the splitting roller 30 toward the axis of rotation 34) that is greater than its width. In one exemplary embodiment, the grooves 42 may have a depth of around 0.05 inches (1.27 mm). In at least one embodiment, the teeth 46 may have the same height as the flats 44.

Each groove 42 and tooth 46 may be configured without sharp edges or corners to help separate the fiber material 18 into bundles while inhibiting or reducing the severing of individual fibers. For instance, each tooth 46 may have a tip 50 that is rounded or provided with a continuous radius to help push fibers into an adjacent groove 42. Similarly, each groove 42 may have a radius or area of curvature 52 at its bottom proximate a base of a tooth 46. The radius or area of curvature 52 at the bottom of each groove 42 may be less than that at the tip 50 of each tooth 46. As such, the bottom of each groove 42 may include a flat portion 54. The smaller radii or area of curvature 52 at the bottom of each groove 42 may be provided to increase the volume or capacity of each groove 42 and/or to help inhibit bundles from clogging the grooves 42 while improving the durability and manufacturability of the teeth 46.

In FIG. 4, a set of grooves 42' are shown in a repeating serpentine arrangement. In this embodiment, the width of each groove 42' is approximately the same as the width of each tooth 46'. For instance, each groove 42' and tooth 46' may have a width of around 0.02 inches (0.5 mm). As such, the grooves 42' and teeth 46' may generally be configured as mirror images of each other. The grooves 42' may be configured with a depth that is greater than its width. For instance, each groove 42' may have a depth of around 0.125 inches (3.175 mm). Each groove 42' and tooth 46' may be configured without sharp edges or corners to help separate the fiber material 18 into bundles while inhibiting or reducing the severing of individual fibers. The tip 50' of each tooth 46' and the bottom 52' of each groove 42' may be provided with a continuous radius or area of curvature. These radii may be the same in one or more embodiments. The continuous radius at the bottom 52' of each groove 42' may help facilitate the release of a bundle 32 from each groove 42' to inhibit clogging and improve the durability and manufacturability of the teeth 46'.

Referring again to FIG. 1, the apparatus 20 may also include a drive roller 60 and a cutting wheel or cutting roller 62. The drive roller 60 may be configured to rotate about axis of rotation 64. The cutting roller 62 may be configured to rotate about axis of rotation 66. In at least one embodiment, one or more axes of rotation 34, 64, 66, may be disposed substantially parallel to each other.

The drive roller 60 may be configured to engage and rotate the splitting roller 30 and/or the cutting roller 62. More specifically, the drive roller 60 may be coupled to an actuator, such as an electrical, pneumatic, or hydraulic actuator, that may be adapted to rotate the drive roller 60 about its axis of rotation 64. Rotation of the drive roller 60 may then rotate the splitting roller 30 and/or cutting roller 62 about their respective axes of rotation 34 and 66. Such an arrangement may allow the splitting roller 30 to be placed in close proximity to the cutting roller 62 to reduce the likelihood of tangling or rebundling of the fiber material 18 after it has been separated into bundles 32. The drive roller 60 may be configured to rotate the splitting roller 30 in the same direction as the feed direction 26 of the fiber material 18 to help maintain tension on the fiber material 18 and to help inhibit clogging of the splitting roller 30 as represented by the arrow disposed around axis of rotation 34 in FIG. 2.

The drive roller 60 may include a cover layer 68 disposed around its outer circumference. The cover layer 68 may be made of a resilient material like rubber to inhibit wear and to provide a desired amount of friction against the fiber material 18 to help pull the fiber material 18 and/or to inhibit slipping with respect to the splitting roller 30 and/or cutting roller 62. Optionally, the drive roller 60 or its cover layer 68 may also engage a second guide roller 70 between which the fiber bundles 32 may be routed.

The cutting roller 62 may include a plurality of blades or teeth that cut the bundles 32 into shorter fiber rovings 16. For instance the cutting roller 62 may include a plurality of spaced apart cutting edges that are configured to cut the bundles 32 against the drive roller 60. The cutting edges may be configured to cut the bundles 32 into any desired length, such as approximately 1 to 2 inches (25.4 mm to 50.8 mm) in length. In addition, cutting may occur as a dry process without wetting the fiber material 18 with water or another liquid. The resulting fiber rovings 16 may then be collected or dispensed onto a conveyor belt 80 and subsequently processed to form the article 12. Alternatively, the fiber rovings 16 may be dispensed on to a polyethelene film and/or a resin compound or resin paste 14 without being collected or dispensed onto a conveyor belt 80. Exemplary equipment and associated methodologies for making an article with and without a conveyor belt are described in U.S. Pat. No. 7,691,223, which is assigned to the assignee of the present invention and is hereby incorporated by reference in its entirety.

Figure 5:
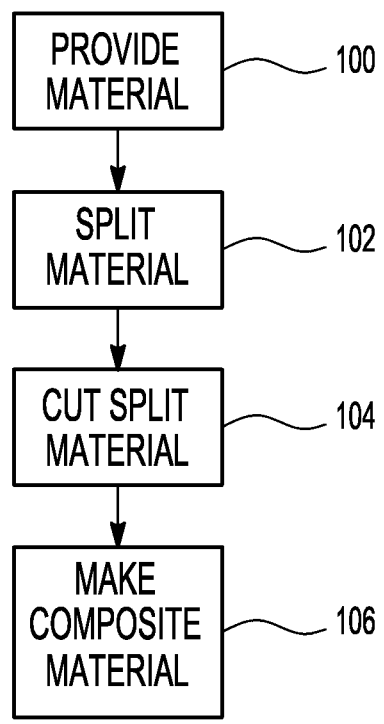
FIG. 5 is a flowchart of a method for producing an article.

Referring to FIG. 5, a flowchart of an exemplary method of making an article 12 is shown. At 100, material such as a fiber material 18 may be provided to an apparatus 20 as previously described. At 102, the fiber material 18 may be split or separated into bundles 32 with a splitting roller 30 as discussed above. At 104, the bundles 32 may be cut into fiber rovings 16 having a shorter length. At 106, a composite material may be made using the fiber rovings 16. In one exemplary embodiment, the fiber rovings 16 may be placed, transported to, or dispensed on a polyethelene release film 82 to which a resin paste 14 is applied.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A method of producing an article, comprising:
   providing a fiber material;
   splitting the fiber material with a splitting roller having a set of grooves that extend continuously around a circumference of the splitting roller, wherein each member of the set of grooves has a flat bottom that extends around the splitting roller and is separated from an adjacent member of the set of grooves by a tooth including a tip having a substantially constant radius of curvature that extends continuously around the splitting roller; and
   cutting the fiber material to a desired length.

2. The method of claim 1 wherein the splitting roller separates the fiber material into bundles without cutting the fiber material.

3. The method of claim 1 wherein members of the set of grooves are disposed substantially parallel to each other.

4. The method of claim 1 wherein each member of the set of grooves extends substantially perpendicular to an axis of rotation of the splitting roller.

5. The method of claim 1 wherein a tooth is disposed between adjacent members of the set of grooves, wherein a tip of the tooth is provided with a continuous curved surface.

6. The method of claim 1 wherein the splitting roller does not rotate against a feed direction of the fiber material.

7. The method of claim 1 wherein a drive roller engages an exterior surface of the splitting roller to rotate the splitting roller.

8. The method of claim 7 wherein the drive roller engages and rotates a cutting roller that is spaced apart from the splitting roller.

9. The method of claim 1 wherein the fiber material is carbon fiber.

10. An apparatus for producing a fiber reinforced article, comprising:
    a splitting roller configured to rotate about a first axis, the splitting roller having a set of grooves that extend around a circumference of the splitting roller in a substantially parallel relationship for splitting a fiber material, wherein each member of the set of grooves has a flat bottom that extends around the splitting roller and is separated from an adjacent member of the set of grooves by a tooth including a tip having a substantially constant radius of curvature that extends continuously around the splitting roller;
    a cutting roller spaced apart from the splitting roller and configured to rotate about a second axis; and
    a drive roller configured to rotate the splitting and cutting rollers about the first and second axes.

11. The apparatus of claim 10 wherein the first and second axes are disposed substantially parallel to each other.

12. The apparatus of claim 10 wherein a depth of each groove is greater than a width of each groove.

13. The apparatus of claim 10 wherein each groove includes a bottom surface having a flat portion disposed adjacent to a radius of curvature disposed at a base of the tooth.

14. An apparatus for producing an article, comprising:
    a splitting roller having a set of grooves that extend around a circumference of the splitting roller in a substantially parallel relationship, wherein each member of the set of grooves has a flat bottom that extends around the splitting roller and is separated from an adjacent member of the set of grooves by a tooth including a tip having a substantially constant radius of curvature that extends continuously around the splitting roller;
    a drive roller configured to rotate the splitting roller; and
    a fiber material that is separated into bundles by the splitting roller when the splitting roller is rotated by the drive roller.

15. The apparatus of claim 14 further comprising a cutting roller that engages the drive roller, wherein the bundles are cut to a shorter length when the cutting roller is rotated by the drive roller.

16. The apparatus of claim 14 wherein each member of the set of grooves extends substantially perpendicular to an axis of rotation of the splitting roller and a tooth having a tip with a curved surface is disposed between adjacent members of the set of grooves.

17. The apparatus of claim 16 wherein the tooth extends completely around the circumference of the splitting roller.

* * * * *